United States Patent [19]

Hashimoto

[11] Patent Number: 5,694,167
[45] Date of Patent: Dec. 2, 1997

[54] IMAGE PICK UP DEVICE USING TRANSFER REGISTERS IN PARALLEL WITH ROWS OF LIGHT RECEIVING CELLS

[75] Inventor: Seiji Hashimoto, Yokohama, Japan

[73] Assignee: Canon Kabushiki Kaisha, Tokyo, Japan

[21] Appl. No.: 148,414

[22] Filed: Nov. 8, 1993

Related U.S. Application Data

[63] Continuation of Ser. No. 794,230, Nov. 19, 1991, abandoned.

[30] Foreign Application Priority Data

Nov. 22, 1990 [JP] Japan ................... 2-315971
Nov. 30, 1990 [JP] Japan ................... 2-335253

[51] Int. Cl.$^6$ .................................................. H04N 5/335
[52] U.S. Cl. ................................... 348/297; 348/364
[58] Field of Search .............................. 348/220, 221, 348/207, 311, 312, 314, 294, 297, 222, 316, 216, 362, 364, 365, 229; 250/208.1; H04N 5/335

[56] References Cited

U.S. PATENT DOCUMENTS

| | | |
|---|---|---|
| 4,644,403 | 2/1987 | Sakai et al. . |
| 4,829,368 | 5/1989 | Kobayashi et al. . |
| 4,914,319 | 4/1990 | Hashimoto . |
| 4,954,900 | 9/1990 | Frame . |
| 5,019,702 | 5/1991 | Ohzu et al. . |
| 5,101,276 | 3/1992 | Ohta . |

FOREIGN PATENT DOCUMENTS

| | | | |
|---|---|---|---|
| 0244230 | 11/1987 | European Pat. Off. | H04N 3/15 |
| 63-123282 | 5/1988 | Japan | H04N 5/335 |
| 63-193772 | 11/1988 | Japan | H04N 5/335 |
| 63-306779 | 12/1988 | Japan | H04N 5/235 |
| 1-053686 | 3/1989 | Japan | H04N 5/335 |
| 1-125072 | 5/1989 | Japan | H04N 5/335 |
| 1176173 | 7/1989 | Japan | H04N 5/335 |
| 1-228378 | 9/1989 | Japan | H04N 5/335 |
| 2-124685 | 5/1990 | Japan | H04N 5/335 |

Primary Examiner—Thai Tran
Assistant Examiner—Tuan V. Ho
Attorney, Agent, or Firm—Fitzpatrick, Cella Harper & Scinto

[57] ABSTRACT

An image pick up device has a plurality of rows of light receiving cells, a plurality of vertical transfer registers each located adjacent to respective one row of light receiving cells and a control circuit for controlling said light receiving cells and the vertical transfer registers. The control circuit makes the light receiving cells and the vertical transfer registers carry out a short exposure operation and a long exposure operation continuously, and then reads out both signals sequentially or in parallel to synthesise an expanded dynamic range signal.

41 Claims, 9 Drawing Sheets

IMAGE PICK UP DEVICE USING TRANSFER REGISTERS IN PARALLEL WITH ROWS OF LIGHT RECEIVING CELLS

This application is a continuation of application Ser. No. 07/794,230 filed Nov. 19, 1991, now abandoned.

FIELD OF THE INVENTION

This invention relates to an image pick up device having a plurality of rows of light receiving cells for converting an optical image into an electrical signal.

PRIOR ART

Conventional video cameras produce pictures having a narrower dynamic range than conventional silver halide photographic film. In such cameras there is, therefore a tendency for extremely bright parts and extremely dark parts of an image to become plain white and plain black respectively. In conventional video cameras, a known technique for compensating for this phenomenon is to adjust the iris.

However, defects may still remain, such that not all of the image can be adjusted to a proper level because of the limited dynamic range.

This problem can be solved by for example synthesising two images, one of which has an exposure period of 1/60 second while the other has an exposure period of 1/1000 second. In this method the two images have an exposure period which differs by a factor of sixteen, so that the dynamic range can be expanded by about 16 times, making it as wide as that for photography. This technique is disclosed in, for example, Japanese Laid Open Patent 1-176173, and Japanese Laid Open Patent 63-306779 etc.

JP 1-176173 has an interline transfer type CCD which has many pairs of vertical transfer CCD elements, located adjacent to both sides of each vertical row of light receiving cells. Each vertical transfer CCD stores the respective image signal which was formed by a predetermined exposure of a different period from the period of another image signal. However, according to the disclosure, each vertical row of light receiving cells has two vertical tranfer CCD's, so that each light receiving cell can only have a small, limited, light receiving area and therefore has low sensitivity.

JP 63-306779 uses an ordinary image pick up device, it changes the exposure period field by field and it synthesises two consecutive fields, so that the synthesised image has insufficient definition if an object is moving.

SUMMARY OF THE PRESENT INVENTION

An object of the present invention is to provide an improved image pick up device. Another object is to provide an improved video camera.

According to an aspect of the present invention, there is provided an image pick-up device comprising: a plurality of rows of light receiving cells for converting an optical image into an electrical signal; a plurality of transfer registers each located adjacent to a corresponding row of light receiving cells, said registers being arranged to receive a charge signal from said row of light receiving cells and to transfer said charge signal serially to read it out, wherein said transfer registers are light shielded; and a control circuit for driving said light receiving cells and the transfer registers; characterised in that: the control circuit clears unnecessary charge in said light receiving cells, transfers charge signals generated in the light receiving cells to the transfer registers after a first exposure period and carrys out a second exposure for a second exposure period that is different from said first exposure period for storing a first and a second image signal in the pick-up device.

The invention provides the advantage of increasing dynamic range without reducing the effective light receiving area. Furthermore, in one field period, two consecutive images can be obtained, ensuring that a synthesised image will not lose resolution even if an object is moving.

Further features, aspects, objects and advantages of the present invention will be apparent from the following description of an embodiment given by way of non limiting Example.

DETAILED DESCRIPTION OF THE ILLUSTRATIVE EMBODIMENT

Figure 1:
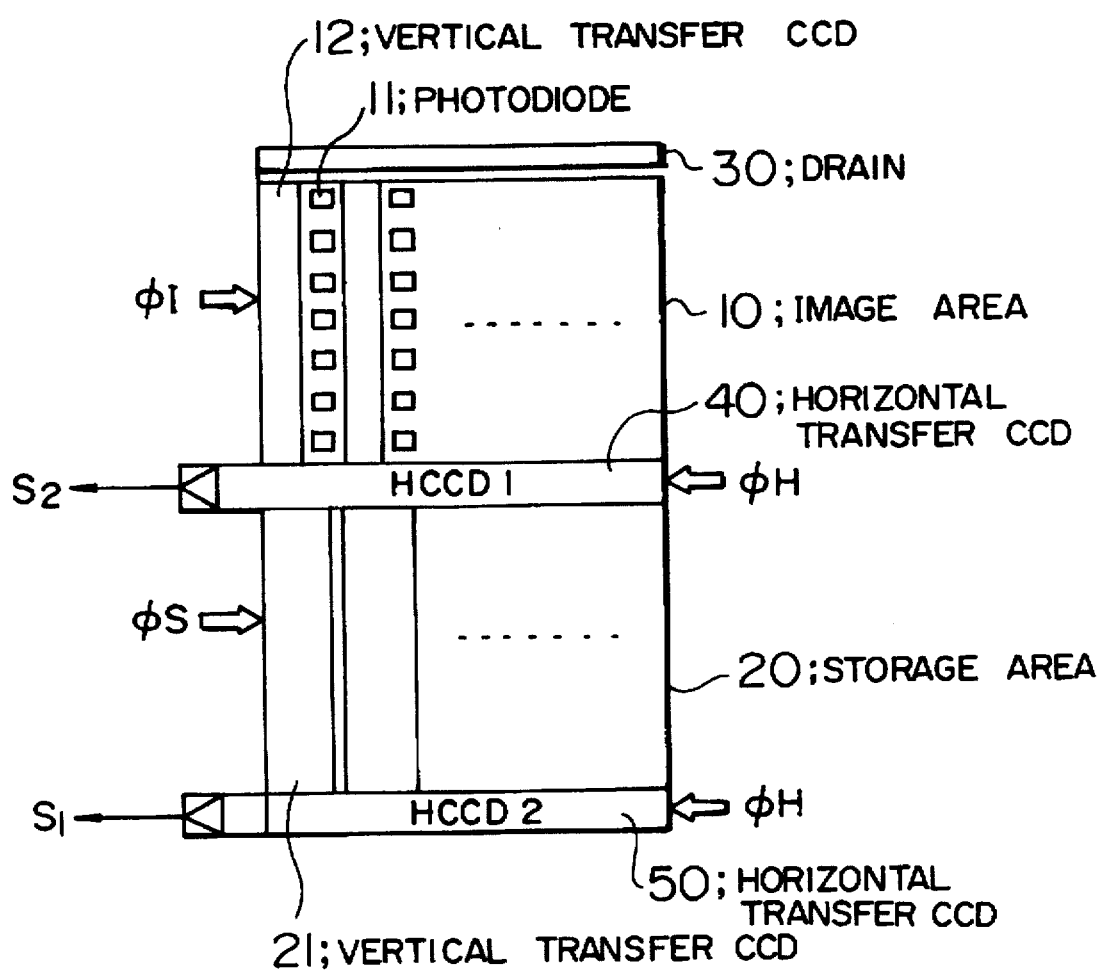
FIG. 1 illustrates a plan view of an image pick up device of a first embodiment.

In FIG. 1, numeral 10 denotes an image area, 20 denotes a storage area, 30 denotes a drain, 40 and 50 denote horizontal transfer charge coupled devices, CCD's.

The image area 10 consists of photodiodes 11 and a plurality of vertical transfer CCD's 12 for storing charge signals generated in said photodiodes 11, after a photoconversion operation. The vertical row of photodiodes 11 and the vertical transfer CCD's are arranged vertical row by vertical row. The vertical transfer CCD's 12 are light shielded, and the stored charge signal is transferred to the storage area 20 by a vertical transfer pulse $\phi L$.

The drain 30 is located at the upper end of the image area 10 for removing unnecessary charges generated in said image area 10.

The storage area 20 is also light shielded and consists of a plurality of vertical transfer CCD's 21 for storing vertically transferred charges from the image area 10. The horizontal transfer CCD 40 is located between the image area 10 and the storage area 20, while the horizontal transfer CCD 50 is located below the storage area 20. The horizontal transfer CCD 40 and the horizontal transfer CCD 50 transfer charge signals respectively via said vertical transfer CCD 12, 21 to an output amplifier.

Figure 2:
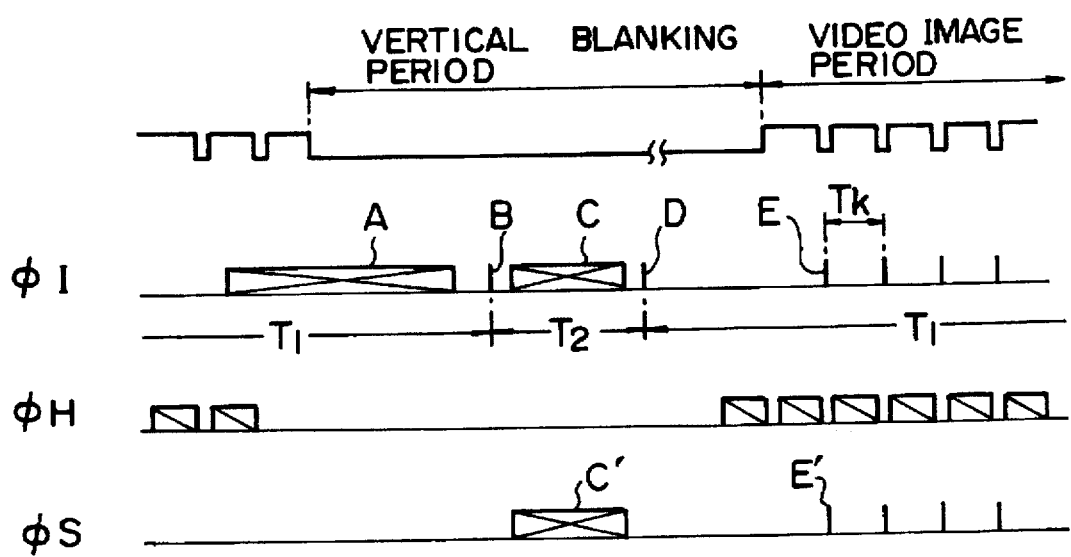
FIG. 2 illustrates a timing chart of the first embodiment.

An operation of the above mentioned image pick up device will be explained with reference to FIG. 2. The photodiodes 11 are exposed twice within one field period; T1 denotes a first exposure period and T2 denotes a second exposure period. T1 is longer than T2.

At the end of the first exposure period T1, reverse transfer pulses φI, identified as A in the Figure, are supplied to the vertical transfer CCD 12 in order to transfer unneccessary charge remaining in the vertical transfer CCD 12 to the drain 30. Thereafter, a transfer pulse φI, identified as B in the Figure, is supplied to the vertical transfer CCD 12 for transferring charges generated in the photodiodes 11 to the vertical transfer CCD 12. Transfer pulse φI, identified as C, and transfer pulse φS, that is dubbed C', are supplied to the image pick up device to transfer charge from said vertical transfer CCD 12 to the storage area 20, while the photodiodes 11 are under the second exposure period T2 after the pulse B.

Next, transfer pulse φI, identified as D, is supplied to the image pick up device to transfer charge generated in the second exposure period T2 to. the vertical transfer CCD 12.

At this phase in the vertical transfer CCD 21, charge signals generated in the first exposure period T1 are stored, while charge signals generated in the second exposure period are stored in the vertical transfer CCD 12.

After the completion of a vertical blanking period, a transfer pulse φI, (referred to as E) and transfer pulse φS, (referred to as E'), are supplied to the image pick up device for each horizontal blanking period of each horizontal period Tn, in the video image period. Therefore, the charge signal in the vertical transfer CCD 12 and the charge signal in the vertical transfer CCD 21 are transferred, respectively, to the horizontal transfer CCD 40 and to the horizontal transfer CCD 50.

The charges are amplified by output amplifiers during the video scanning period of each horizontal period, in response to the horizontal transfer pulse φH. Here, an output signal from the horizontal transfer CCD 40 is identified as S2 and an output signal from the horizontal transfer CCD 50 is identified as S1.

Figure 3:
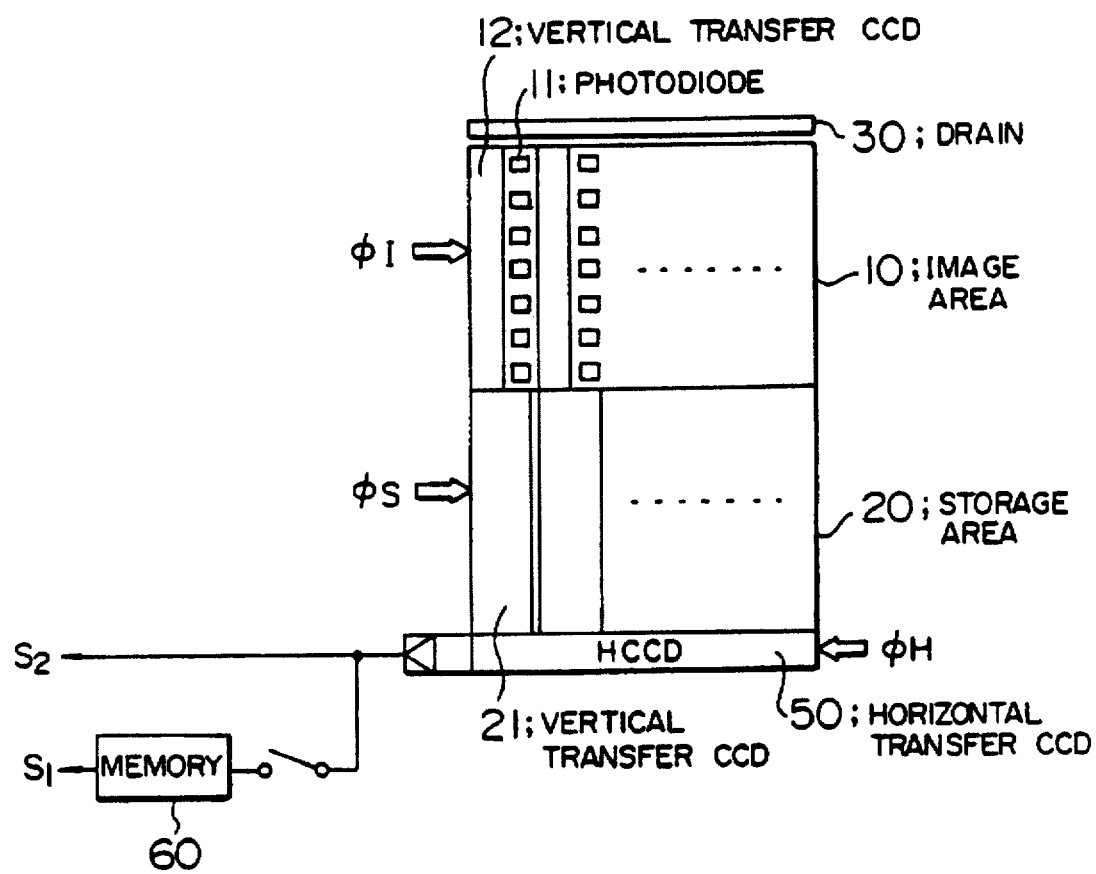
FIG. 3 illustrates a plan view of a second embodiment of the present invention.

FIG. 3 illustrates a plan view of the second embodiment of the present invention, in which similar components, or corresponding components in different fields, are denoted by the same reference numerals.

In this embodiment, the horizontal transfer CCD 40 is omitted and the first image and the second image are stored, in the storage area 20 and the vertical transfer CCD 12 respectively, in the same way as the first embodiment before the reading out operation. However, the two images are read out through the horizontal transfer CCD 50 sequentially.

The read out charge signal generated by the first exposure is stored in a memory 60, and read out at the same time as the signal S2 generated by the second exposure, which is read out from the horizontal transfer CCD 50.

In the first and the second embodiments of the present invention, signals S1 and S2 are obtained at the same time, therefore a subsequent processing circuit for synthesising signals can be simplified. Compared to the prior art, such as Japanese Laid Open Patent 1-176173, this invention has higher sensitivity because it does not limit the effective light receiving area, and the first and second exposure operations are carried out continuously so that a higher resolution can be obtained compared to the prior art, such as Japanese Laid Open Patent 63-306779 even if an object is moving.

Figure 4:
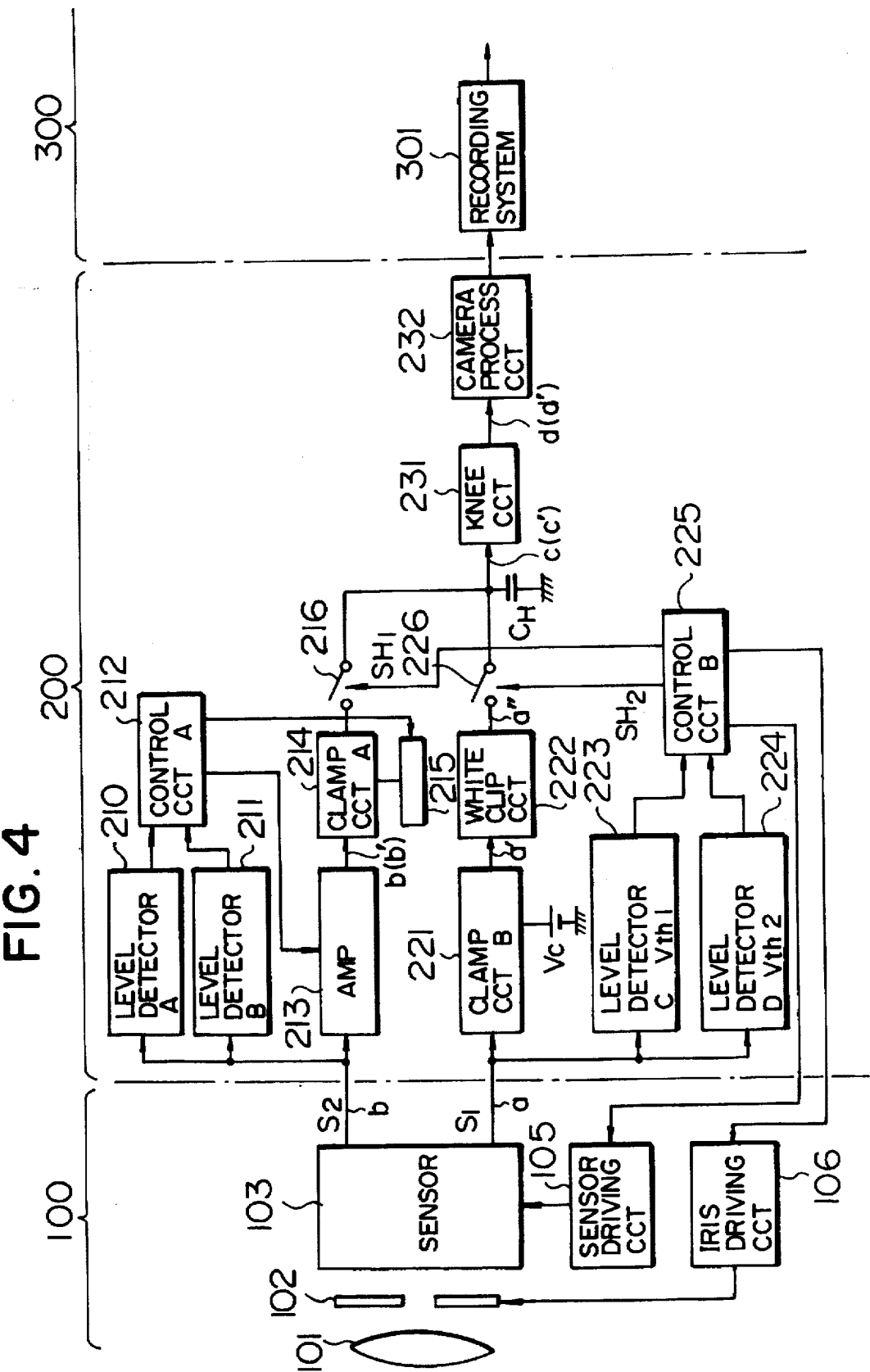
FIG. 4 illustrates a schematic circuit diagram of the present invention.
Figure 5:
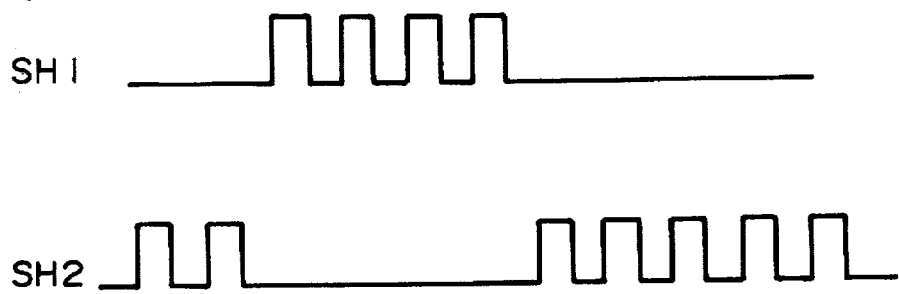
FIG. 5 illustrates a timing chart of sampling pulses used in the circuit shown in FIG. 4.
Figure 6:
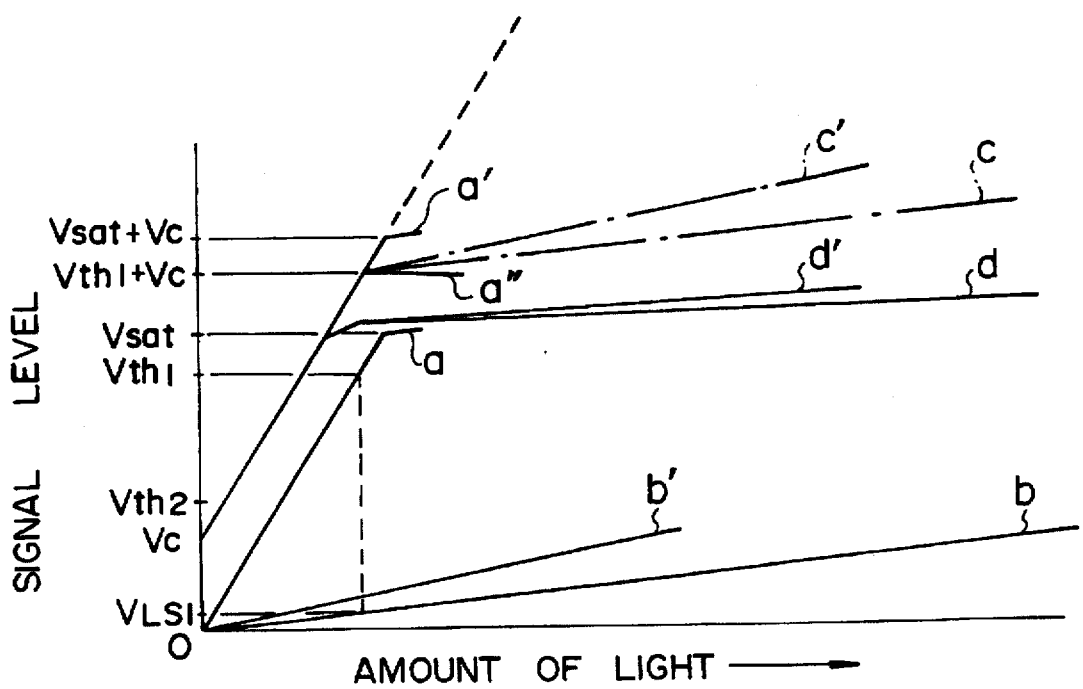
FIG. 6 illustrates the relationship between amount of light and signal level.

A video camera that is suitable for the image pick up devices described will be explained with reference to FIGS. 4, 5 and 6, in which, FIG. 4 illustrates a schematic circuit diagram of the video camera, FIG. 5 illustrates a timing chart of sample hold pulses for synthesising signals S1, S2, and FIG. 6 illustrates the relationship between amount of light and signal levels in the video camera.

The video camera has an optical system 100, a camera signal processing system 200 and a recording system 300, as shown in FIG. 4. In the optical system 100, an amount of light which passes through a lens 101 is restricted by an iris 102, before being focussed on a sensor 103. The sensor 103 is driven by a sensor driving circuit 105 and the iris 102 is driven by an iris driving circuit 106.

The signals S1, S2 are processed in the camera signal processing system 200 so as to expand dynamic range.

The signal S1, that is signal a, from the sensor 103 is saturated at the level Vsat (FIG. 6) when a large amount of light is incident on the sensor 103. The signal S1, that is an output signal a, is clamped to the level of its black portion, by a clamp circuit 221, wherein Vc denotes a clamp voltage.

A signal portion that extends beyond a signal level Vth1+Vc of the signal S1 that is clamped to the voltage Vc, that denotes a', is clipped by a white clip circuit 222, so that a curve a" is folded, as shown in FIG. 6. The white clip operation is performed to eliminate noise generated by the sensor. The noise level increases, particularly around the saturation level of the sensor.

A level detector 223 is connected to an output terminal of the sensor 103 for the signal S1, for detecting whether the signal level is saturated or not. In this embodiment, the detecting threshold level is set at the same level as the white clip level Vth1.

A level detector 223 is connected to a control circuit 225 for making the control circuit 225 produce sample and hold pulses SH1, SH2, which are for controlling sample and hold switches 216 and 226 respectively, the pulses being shown in FIG. 5. The control circuit 225 controls an iris driving circuit 106 so as to adjust the iris 102 properly, according to a statistical level distribution of the signal S1 which is detected by the level detectors 223, 224. Here, the detection level of the level detector 223 is Vth1, and the detection level of the level detector 224 is Vth2.

The signal processing method for the signal S2 from the sensor 103 will now be explained. While the signal level of the signal S2 is about 1/16th of the level of the signal S1, and the gain of amplifier 213 is set at unity, the signal S2 that corresponds to an output signal b is supplied to a clamp circuit 214 through the amplifier 213 as a signal b.

Signal S1 (shown as a curve a in FIG. 6) is input to the level detector 223 and, if the level of the signal S1 is over the level Vth1, it is detected by the level detector 223 and the signal S1 is clamped and clipped by the white clip circuit 222, (show as a curve a" in FIG. 6). Therefore, a signal that is over the level Vth1+VC of the signal S1 should be replaced by the signal S2.

The signal level of signal S2 (an output signal b) corresponding to the signal level Vth1 of the signal S1 (an output signal a) is identified as VLS1 and the level of VLS1 is defined as follows:

$$VLS1 = Vth1 \times T2/T1 \cong Vth1/16$$

Here, a signal portion of the signal S2 (shown as a straight line b in FIG. 6) which is over the level VLS1 should be added to a signal portion of the signal S1 (shown as a curve a" in FIG. 6) which is over the signal level Vth1+VC. Then, the clamp voltage VC' of the clamp circuit 214 should be set at the voltage which is Vth1−VLS1 higher than that clamp voltage VC of the clamp circuit 221.

The signal passed through the clamp circuit 214 is supplied to the input of a sample and hold switch 216, which is actuated by a sample and hold pulse SH1 from the control circuit 225, when signal S1 is saturated.

Therefore, signal S1 (that is an output signal of the white clip circuit 222, and shown as a curve a' in FIG. 6) is sampled and held in a hold condenser CH when the signal S1 is not saturated, and the signal S2 (an output. signal of the clamp circuit 214) is sampled and held when the signal S1 is saturated. In this way the signals S1 and S2 are synthesised as shown by curve c in FIG. 6. A high level portion of this synthesised signal is then suppressed by a knee circuit 231.

In this embodiment, the knee circuit 231 suppresses the high level signal portion by making it ¼ of the input signal. The knee processed signal d is further processed in a camera process circuit 232, providing gamma compensation, etc.

An output of the camera process circuit 232 is introduced to the recording device 301, such as video tape or floppy disk.

If the incident light applied to sensor 103 is not particularly strong, the dynamic range does not have to be as wide as in the previous example. An example will now be described in which the dynamic range may be increased by a factor of eight.

A level detector 210 detects the statistical frequency at which a signal level is over the level Vth1 (nearly equal Vth1/1/6), while the level detector 211 detects the statistical frequency of the signal level which is over the level Vth2' (nearly equal Vth2/1/6).

If the detected frequency of the level detector 210 is high, the control circuit 212 makes the exposure period T2 short, that is shorter than ¹⁄₁₀₀₀ second. If the detected frequency of the level detector 210 is low, because the brightness of the image is not so high, the control circuit 212 doubles the gain of the amplifier 213.

The two times amplified signal v' is supplied to the clamp circuit 214 and the clamp voltage VC' is defined by the following equation.

$$VC'=VC+Vth1-Vth1/8$$

Thus as an output of the clamp circuit 214 becomes signal c', this signal c' is converted to a signal d' by the knee circuit 231. Therefore, according to the strength of the incidental light, the characteristic of an output from the knee circuit 231 is optimized and an input signal level to a camera process circuit 232 is also optimized.

Figure 7:
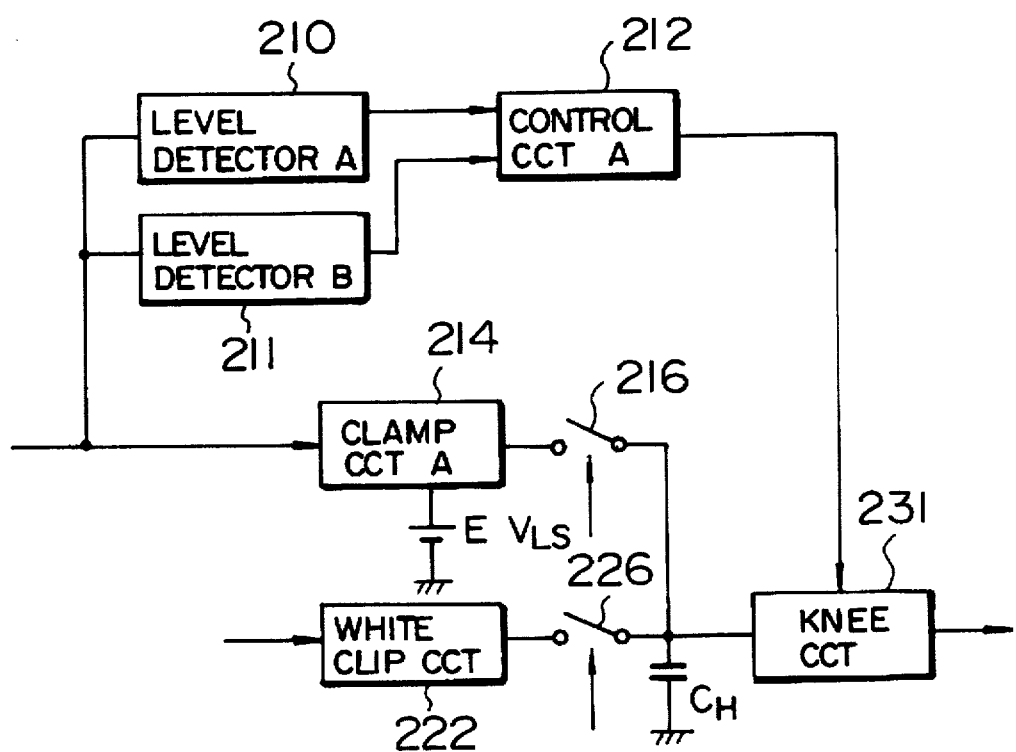
FIG. 7 illustrates a schematic circuit diagram of a third embodiment.

FIG. 7 illustrates a partial circuit block diagram of another embodiment of the video camera, in which the input signal level adjustment for the camera process circuit 232 is carried out by the knee circuit 231 instead of by the amplifier 213.

The control circuit 212 controls a knee characteristic of the knee circuit 231 according to the output of the level detector 210 and 211, that is according to the statistical frequency of the signal level, so as to adjust the slope of a knee curb in FIG. 7 to for example ¼, or ½ etc.

The long exposed light signal and the short exposed light signal can be read out simultaneously, deterioration of the resolution or the sensitivity can be prevented and a wide dynamic range can be obtained.

Furthermore, because of the aforementioned simultaneous reading out, the following camera signal processing circuit can be simplified.

A further embodiment of the present invention will be explained, with reference to FIG. 8, which illustrates an image pick up device and with reference to FIG. 9, which illustrates a sectional view of the image pick up device of FIG. 8.

Figure 8:
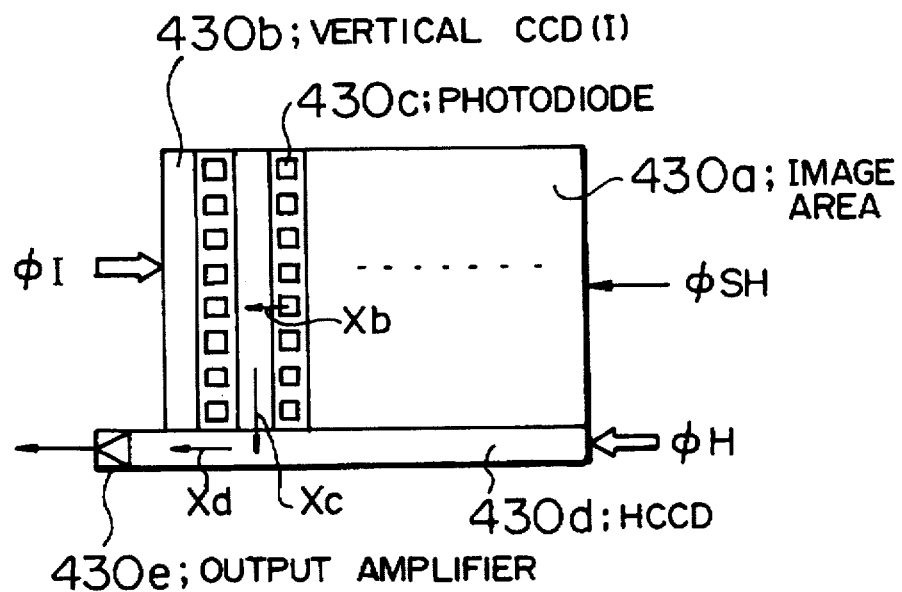
FIG. 8 illustrates another type of image pick up device applicable to the third embodiment of the present invention.

In FIG. 8 numeral 430a denotes an image area consisting of rows of photodiodes 430c and vertical transfer CCDs 430b, for storing charge signals generated in the photodiodes 430c after a photoconversion operation. The rows of photodiodes 430c and the vertical transfer CCD's 430b are alternately arranged in the image area 430a.

Each vertical transfer CCD 430b is light shielded, and transferred charge signals from the photodiodes 430c are further transferred to a horizontal transfer CCD 430d by each vertical transfer pulse φI which is supplied in each horizontal blanking period of each horizontal period. The vertical transfer CCD 430b and the horizontal transfer CCD 430d constitute the transfer means.

Figure 9:
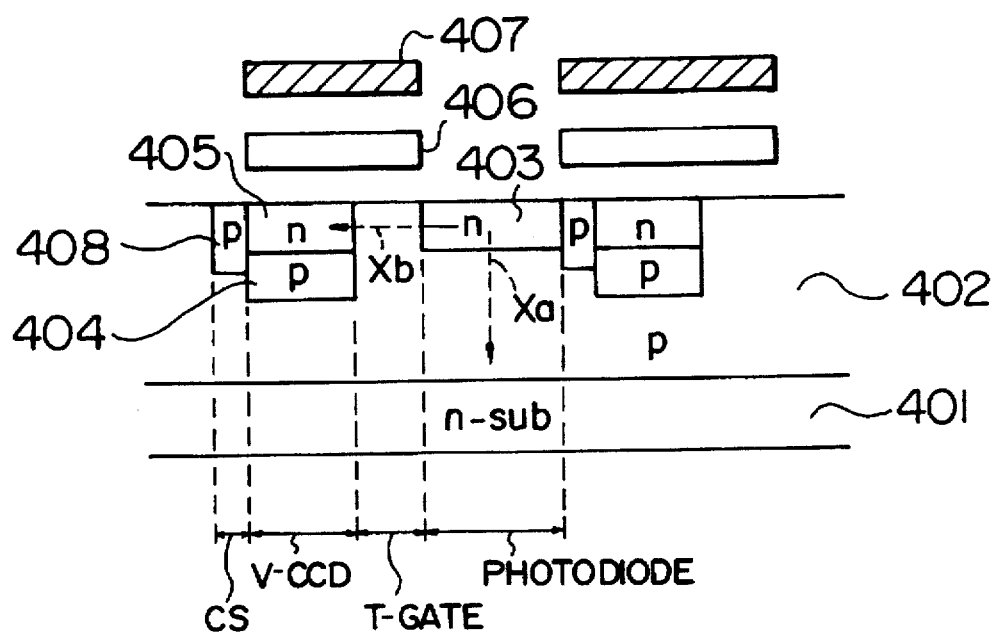
FIG. 9 illustrates a sectional view of the image pick up device shown in FIG. 8.

In this embodiment, the pick up device is not limited to the one which is shown in FIGS. 8 and 9, for example the image pick up devices such as shown in FIGS. 1 or 3 may be applied to this embodiment.

The charge signal stored in the horizontal transfer CCD 430d is transferred to the output amp 430e by horizontal transfer pulses φH and is then converted to a voltage signal for the output.

Unnecessary charge stored in the photodiodes 430c are eliminated to the CCD substrate (that is N type semiconductor substrate 401 in FIG. 9) by supplying said pulses φSH.

As shown in FIG. 9, a first well 402 over a P type semiconductor is formed on the N type semiconductor substrate 401, and an N type semiconductor region 403 is formed in the first well 402 for constituting a photodiode 430c. A second well 404 of P type semiconductor and N type semiconductor area 405 are formed in the first well 402 for constituting the vertical transfer CCD 430b. Polycrystal region 406 is formed as a transfer gate above the first well 402 of P type, which is between the N type semiconductor region 403 and the N type semiconductor region 405, above the N type semiconductor region 5. Above the polycrystal region 6, an A1 layer 407 is located for light shielding. Between sensor regions, consisting of a photodiode 430c and a vertical transfer CCD 430b, a channel stop region is formed by P type semiconductor regions 408.

Here the N type semiconductor region 403 and the N type semiconductor region 405 respectively correspond to a drain region and a source region of a N channel insulated gate type transistor. Charge accumulated in the N type semiconductor region 403 is transferred to the N type semiconductor region 405 when a positive voltage φI is applied to the polycrystal region 406 of the gate. By applying a negative voltage φI to the polycrystal region 406, a vertical transfer operation by the vertical transfer CCD 430b is carried out.

Meanwhile, in FIG. 8 and FIG. 9, Xa denotes a draining channel for unnecessary charge in the photodiode 430c. Xb denotes a transfer channel of photocharge from the photodiode 430c to the vertical transfer CCD 430b. Xc denotes a transfer channel for signal charge from the vertical transfer CCD 430b to the horizontal transfer CCD 430d. Xd denotes a transfer channel for signal charge in the horizontal transfer CCD 430d.

Operation of this embodiment will be explained with reference to FIG. 10, which illustrates a timing chart.

TS1 denotes a period for a first exposure of a short period exposure operation and TS2 denotes a period of a second exposure at a long period exposure operation.

TS1' denotes a period for transferring a signal generated during the first exposure and TS2' denotes a period for transferring a signal generated during the second exposure.

One of the features of this embodiment is that the first exposure and the second exposure are carried out substantially continuously.

Figure 10:
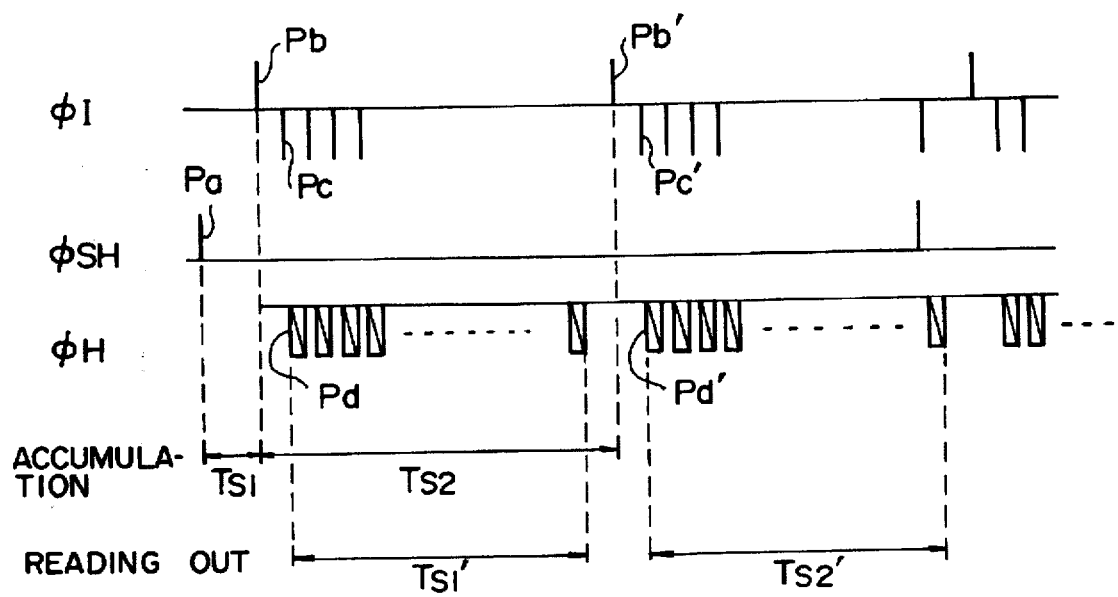
FIG. 10 illustrates a timing chart of the third embodiment of the present invention.

As shown in FIG. 10, by applying a shutter pulse φSH (Pa in FIG. 10) to the CCD substrate (N type semiconductor substrate 401), charges in the photodiodes 430c are drained, thereby allowing a photoconversion operation to be initiated.

Next, by applying a pulse φI (Pb in FIG. 10), photocharge in the photodiode 430c is transferred to the vertical transfer CCD 430b and the first exposure period is terminated. In this embodiment, this operation is called a CCD shutter operation.

The second exposure operation will now be explained. After the first exposure operation, the photodiode 430c subsequently starts the second exposure operation as the long period exposure operation. This second exposure operation can be finished after the photocharge generated in the first exposure operation has been completely transferred to the vertical transfer CCD 430b. During this period, the photocharge generated by the first exposure is read out from the image sensor; the period TS1' being within the period TS2. The signal charge in the vertical transfer CCD 430b is transferred to the horizontal transfer CCD 430d by the pulse φI (Pc in FIG. 10) in each horizontal blanking period, and is output from the image sensor through the output amplifier 430e by supplying the pulse φH (Pd in FIG. 10) in the horizontal effective period.

After the transferring operation of the signal generated in the first exposure operation, by supplying pulse φ2 (Pb' in FIG. 10), the photocharge generated in the second exposure operation is transferred to the vertical transfer CCD 430b from the photodiode 430c, thereby finishing the second exposure operation.

After the second exposure operation, the photocharge generated during the second exposure operation is output from the image sensor in the same way as the signal generated by the first exposure operation, by supplying the pulses φ2 (Pc' in FIG. 10) and the pulses φH (Pd' in FIG. 10).

Thus, in accordance with this embodiment, by using only a general purpose low cost CCD, the short period exposure operation and the long period exposure operation can be performed with minimal time lag. Furthermore, by synthesising both signals, an expanded dynamic range can be obtained.

Figure 11:
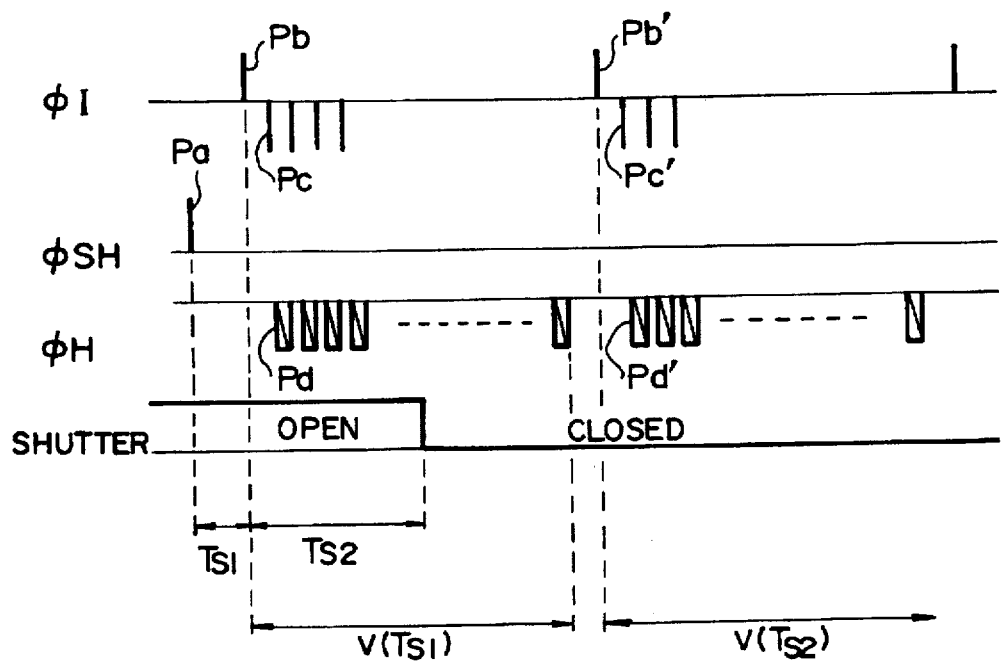
FIG. 11 illustrates another part of the timing chart of the third embodiment.

FIG. 11 illustrates a timing chart of a fourth embodiment of the present invention, in which the difference from the third embodiment, shown in FIG. 10, is that the ending of the second exposure operation is controlled by a shutter member.

The shutter comprises a mechanical shutter, or an optical shutter, that is consisting of a material such as a liquid crystal. The shutter is normally open and while open, the first exposure operation is carried out in the same way as the aforementioned CCD shutter operation. In the third embodiment, shown in FIG. 10, the second exposure period TS2 should be longer than the transferring period TS1' for the signal generated during the first exposure period, because the signal generated during the second exposure period cannot be transferred to the vertical transfer CCD until the transferring operation of the signal generated during the first exposure period is finished. On the contrary to the third embodiment, in this embodiment, by adopting another shutter member, the second exposure period can be terminated before the completion of the transferring operation of the signal generated in the first exposure period.

The abovementioned embodiments may be applied not only to a movie video camera, but also to a still video camera. For example, in the third embodiment, the signal generated by the short exposure operation and the signal generated by the long exposure operation can be obtained alternately field-by-field, so these signals can be processed as an ordinary movie video signal, in a movie video camera. Furthermore, by selecting one of the signals, it can be recorded in a still video camera system.

In the fourth embodiment, shown in FIG. 11, if the shutter member is such as a rotary shutter member, the signal generated by the short period exposure operation and the signal generated by the long period exposure operation can be obtained field-by-field so as to be suitable for the movie video camera. Furthermore, if the shutter member is formed by an iris shutter, a liquid crystal shutter or a focal plane shutter, one of the field signals corresponds to the signal generated by the short exposure operation and the signal generated by the long exposure operation can be selected for the still video camera.

In the fourth embodiment shown in FIG. 11, the long exposure operation can be carried out in advance of the short exposure operation. In this case, more precise exposure operations can be carried out because the CCD shutter operation is more precise than the mechanical shutter member and the signal generated by the long exposure operation is more important than the signal generated by the short exposure operation in the synthesised signal.

Figure 12:
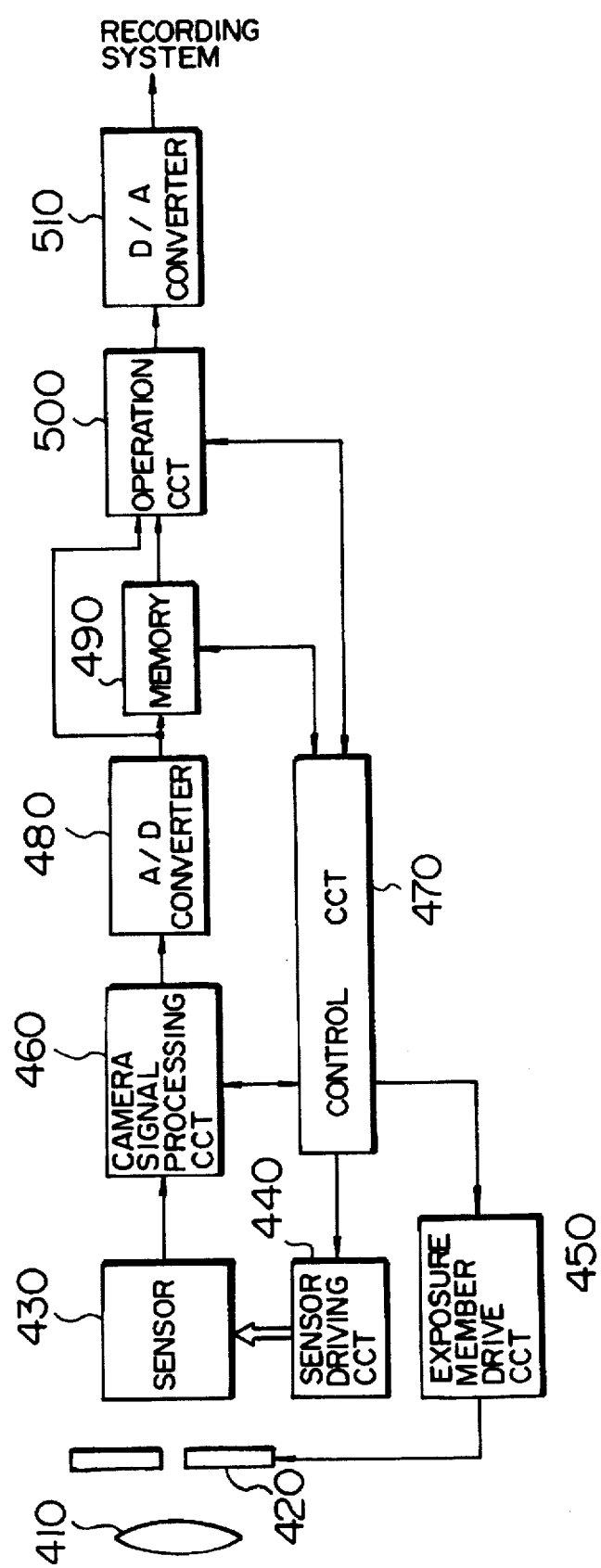
FIG. 12 illustrates a schematic circuit diagram of the third embodiment.

FIG. 12 illustrates a schematic circuit diagram of another embodiment of the video camera.

In the figure, an optical image is focussed on the sensor 430 through a lens 410 and an iris 420. The sensor 430 is driven by a sensor driver circuit 440 controlled by a control circuit 470. The iris 420 is controlled by an exposure member driver circuit 450 which is controlled by the control circuit 470 based on a signal output from the sensor 430. Here, if the video camera shown in FIG. 12 is a still video camera, as mentioned before, the iris is closed after the second exposure operation.

A camera signal processing circuit 460 carries out conventional knee suppression or gamma conversion processing. Circuit 460 also performs analog to digital conversion by an A to D converter 480, so that, in this embodiment, the signal generated by the first exposure operation is converted into a digital signal and is then stored in a memory 490.

In an operational circuit 500, the synthesising operation is carried out by combining the signal generated by the first exposure operation, read out from the memory 490, and the signal generated by the second exposure operation output from the A to D converter 480, for expanding the dynamic range. A control signal for this synthesising operation is generated by the control circuit 470 and, by detecting the saturation of the signal generated by the second exposure operation (the long exposure operation), the detected saturated signal is replaced by the signal generated by the first exposure operation, that is the short exposure operation.

The synthesised signal from the operation circuit 500 is converted to an analog signal by a D to A converter 510 and is then introduced to a recording system.

As explained above, by this fourth embodiment, the second exposure operation can be controlled by another shutter member, such as the mechanical or electronic shutter, so that the period of the second exposure can be set freely to some extent. Therefore, even a high speed moving object can be picked up with expanded dynamic range and high resolution.

What is claimed is:

1. An image pick up device comprising:
   a plurality of rows of light receiving cells for converting an optical image into an electrical signal;

a plurality of transfer registers each located adjacent to and parallel with a corresponding row of light receiving cells, each said transfer register being arranged to receive a charge signal from the corresponding row of light receiving cells and to transfer said charge signal serially to read it out, said transfer registers being light shielded; and a control circuit for driving said light receiving cells and the transfer registers, said control circuit clearing unnecessary charges in said light receiving cells, transferring charge signals generated in the light receiving cells to the transfer registers after a first exposure period, and carrying out a second exposure for a second exposure period which has a length different from said first exposure period for storing a first and a second image signal in the image pick up device, said control circuit (i) carrying out a plurality of consecutive image pick up conversion operations of said light receiving cells in one field period to form a plurality of electric image signals in the one field period, and (ii) reading out said plurality of electric image signals separately from said transfer registers.

2. An image pick up device according to claim 1, wherein the first exposure period is shorter than the second exposure period.

3. An image pick up device according to claim 1, further comprising a shutter member for controlling light incidence on the light receiving cells.

4. An image pick up device according to claim 3, wherein the first exposure period is longer than the second exposure period.

5. An image pick up device according to claim 1, further comprising a storage area connected to the transfer registers for storing the first image signal.

6. An image pick up device according to claim 5, further comprising an additional transfer register located between said transfer registers and the storage area for reading out the second image signal.

7. An image pick up device according to claim 1, further comprising a memory for delaying the first image signal so as to output the first and the second image signals simultaneously.

8. An image pick up device according to claim 1, wherein said synthesizing means selects one of said first and second image signals for outputting.

9. An image pick up device according to claim 1, wherein said synthesizing means adds said first and second image signals.

10. An image pick up device according to claim 1, wherein said synthesizing means clips one of said first and second image signals and adds another one of said first and second image signals corresponding to a clipped part of said one of said first and second image signals.

11. An image pick up device comprising:
(a) image pick up means for converting optical images to electrical signals, said image pick up means including (i) a plurality of rows of light receiving cells for converting the optical images into the electrical signals, and (ii) a plurality of light-shielded transfer registers each located adjacent to and parallel with a corresponding row of light receiving cells, for transferring the electrical signals from said light receiving cells;
(b) control means for controlling said image pick up means to (i) carry out a plurality of image pick up conversion operations in one field period to form a plurality of electrical signals in the one field period, and (ii) read out said plurality of electrical signals separately from said image pickup means, each image pick up conversion operation having a different length image accumulation period;
(c) synthesizing means for producing a synthesized signal by selectively using said plurality of electrical signals; and
(d) knee suppress means for suppressing a knee of said synthesized signal.

12. An image pick up device according to claim 11, wherein said synthesizing means adds said plurality of electrical signals.

13. An image pick up device according to claim 11, wherein said synthesizing means clips one of said plurality of electrical signals and adds another of said plurality of electrical signals corresponding to a clipped part of said one of said plurality of electrical signals.

14. An image pick up device according to claim 11, wherein said synthesizing means selects one of said plurality of electrical signals for outputting.

15. An image pickup apparatus comprising:
(a) image pickup means for converting an optical image to an electrical image signal;
(b) control means for controlling said image pickup means to (i) carry out a plurality of consecutive image pickup conversion operations in one field period to form a plurality of electrical image signals in the one field period, and (ii) read out said plurality of electrical signals separately from said image pickup means, each image pickup conversion operation having a different length image accumulation period;
(c) synthesizing means for producing a synthesized signal by selectively using said plurality of electrical image signals; and
(d) suppressing means for non-linearly suppressing the synthesized signal.

16. Apparatus according to claim 15, wherein one of said plurality of image pickup operations is carried within a vertical blanking period.

17. Apparatus according to claim 15, wherein said synthesizing means adds said plurality of electrical image signals.

18. Apparatus according to claim 15, wherein said image pickup means includes a plurality of rows of light receiving cells for converting the optical image into the electrical image signal, and a plurality of light-shielded transfer registers each located adjacent to and parallel with a corresponding row of light receiving cells, for transferring the electrical image signal from said light receiving cells.

19. Apparatus according to claim 18, wherein said image pickup means further includes a memory connected to said plurality of light-shielded transfer registers.

20. Apparatus according to claim 19, wherein said image pickup means further includes a horizontal transfer means disposed between said plurality of light-shielded transfer registers and said memory.

21. Apparatus according to claim 15, further comprising a level detecting means for detecting levels of said plurality of electrical image signals.

22. Apparatus according to claim 21, further comprising suppression control means for controlling suppression characteristics of said suppressing means according to an output of said detecting means.

23. An image pickup apparatus comprising:
(a) image pickup means for converting an optical image into an electrical image signal, said image pickup means including (i) a plurality of rows of light receiving cells for converting the optical image into the electrical image signal, (ii) a plurality of light-shielded transfer registers each located adjacent to and parallel with a corresponding row of light receiving cells, for transferring the electrical image signal from said light receiving cells, (iii) a memory connected to said plurality of light-shielded transfer registers, (iv) a first horizontal transfer means arranged between said plurality of light-shielded transfer registers and said memory, and (v) a second horizontal transfer means connected to said memory;
(b) control means for controlling said image pickup means to drive said light receiving cells and the transfer registers, said control means clearing unnecessary charges in said light receiving cells, transferring charge signals generated in the light receiving cells to the transfer registers after a first exposure period, and carrying out a second exposure for a second exposure period that is different from said first exposure period for storing a first and a second image signal in the image pickup device, said control means carrying out a plurality of image pickup conversion operations to form a plurality of separate electrical image signals in one field period, each image pickup conversion operation having a different length image accumulation period;
(c) read-out means for reading-out said plurality of electrical signals separately from said first and second horizontal transfer means; and
(d) synthesizing means for producing a synthesized signal by selectively using said plurality of electrical image signals.

24. Apparatus according to claim 23, wherein said plurality of image pickup operations are consecutively carried out in a field period.

25. Apparatus according to claim 23, wherein said synthesizing means adds said plurality of electrical image signals.

26. Apparatus according to claim 23, further comprising level detecting means for detecting levels of said plurality of electrical image signals.

27. Apparatus according to claim 26, further comprising suppressing means for suppressing said synthesized signal according to a suppression characteristic which varies according to an output of said detecting means.

28. An image pickup apparatus comprising:
(a) image pickup means for converting an optical image to an electrical image signal;
(b) control means for controlling said image pickup means to (i) carry out a plurality of image pickup conversion operations in one field period to form a plurality of electrical image signals in the one field period, and (ii) read out said plurality of electrical signals separately from said image pickup means, each image pickup operation having a different length image accumulation period;
(c) synthesizing means for producing a synthesized signal by selectively using said plurality of electrical image signals;
(d) level detecting means for detecting respective levels of said plurality of electrical image signals; and
(e) suppressing means for suppressing said synthesized signal according to a suppression characteristic which varies according to an output of said level detecting means.

29. Apparatus according to claim 28, wherein said plurality of image pickup operations are consecutively carried out in a field period.

30. Apparatus according to claim 28, wherein said synthesizing means adds said plurality of electrical image signals.

31. Apparatus according to claim 28, wherein said image pickup means includes a plurality of rows of light receiving cells for converting the optical image into the electrical image signal, and a plurality of light-shielded transfer registers each located adjacent to and parallel with a corresponding row of light receiving cells, for transferring the electrical image signal from said light receiving cells.

32. Apparatus according to claim 31, wherein said image pickup means further comprises a memory connected to said plurality of light-shielded transfer registers.

33. Apparatus according to claim 32, wherein said image pickup means further comprises a horizontal transfer means disposed between said plurality of light-shielded transfer registers and said memory.

34. An image pickup apparatus comprising:
(a) image pickup means for converting an optical image to an electrical image signal, said image pickup means including (i) a plurality of rows of light receiving cells for converting the optical images into the electrical signals, and (ii) a plurality of light-shielded transfer registers each located adjacent to and parallel with a corresponding row of light receiving cells, for transferring the electrical signals from said light receiving cells;
(b) control means for controlling said image pickup means to drive said light receiving cells and the transfer registers, said control means clearing unnecessary charges in said light receiving cells, transferring charge signals generated in the light receiving cells to the transfer registers after a first exposure period, and carrying out a second exposure for a second exposure period that is different from said first exposure period for storing a first and a second image signal in the image pickup device, said control means (i) carrying out a plurality of image pickup conversion operations to form a plurality of electrical image signals in one field period and (ii) reading out said plurality of electrical image signals separately from said image pickup means, each image pickup conversion operation having a different length image accumulation period;
(c) clamp means for clamping one of said plurality of electrical image signals;
(d) clip means for clipping another of said plurality of electrical image signals; and
(e) synthesizing means for producing a synthesized signal by selectively using outputs of said clamp means and said clip means.

35. Apparatus according to claim 34, wherein said plurality of image pickup operations are consecutively carried out in a field period.

36. Apparatus according to claim 34, wherein said synthesizing means adds said outputs of said clamp means and said clip means.

37. Apparatus according to claim 34, wherein said image pickup means includes a plurality of rows of light receiving cells for converting the optical image into the electrical image signal, and a plurality of light-shielded transfer registers each located adjacent to and parallel with a corresponding row of light receiving cells, for transferring the electrical image signal from said light receiving cells.

38. Apparatus according to claim 37, wherein said image pickup means further comprises a memory connected to said plurality of light-shielded transfer registers.

39. Apparatus according to claim 38, wherein said image pickup means further comprises a horizontal transfer means disposed between said plurality of light-shielded transfer registers and said memory area.

40. Apparatus according to claim 34, further comprising level detecting means for detecting levels of said plurality of electrical image signals.

41. Apparatus according to claim 40, further comprising suppressing means for suppressing said synthesized signal according to a suppression characteristic which varies according to an output of said level detecting means.

* * * * *

UNITED STATES PATENT AND TRADEMARK OFFICE
CERTIFICATE OF CORRECTION

PATENT NO. : 5,694,167
DATED : December 2, 1997
INVENTOR(S) : SEIJI HASHIMOTO

It is certified that error appears in the above-identified patent and that said Letters Patent is hereby corrected as shown below:

On the title page, item [54] and col.1, line 1,

"PICK UP" should read --PICKUP--.

At [56] References Cited

FOREIGN PATENT DOCUMENTS

"1176173 7/1989 Japan" should read --1-176173 7/1989 Japan--.

Attorney, Agent, or Firm

"Fitzpatrick, Cella Harper & Scinto" should read --Fitzpatrick, Cella, Harper & Scinto--.

At [57] ABSTRACT

Line 9, "synthesise" should read --synthesize--.

UNITED STATES PATENT AND TRADEMARK OFFICE
CERTIFICATE OF CORRECTION

PATENT NO. : 5,694,167

DATED : December 2, 1997

INVENTOR(S) : SEIJI HASHIMOTO

It is certified that error appears in the above-identified patent and that said Letters Patent is hereby corrected as shown below:

<u>Column 2</u>

Line "43", "EMBODIMENT" should read --EMBODIMENTS--.

<u>Column 4</u>

Line 51, "Vth1,it" should read --VTHL, it--.

<u>Column 6</u>

Line 45, "of a" should read --of an--.

<u>Column 9</u>

Line 7, "and" should be deleted.

Signed and Sealed this

First Day of September, 1998

Attest:

BRUCE LEHMAN

*Attesting Officer*   *Commissioner of Patents and Trademarks*